(12) United States Patent  
Srikrishna et al.

(10) Patent No.: US 7,031,293 B1  
(45) Date of Patent: Apr. 18, 2006

(54) METHOD AND SYSTEM TO PROVIDE INCREASED DATA THROUGHPUT IN A WIRELESS MULTI-HOP NETWORK

(75) Inventors: Devabhaktuni Srikrishna, Belmont, CA (US); Amalavoyal Chari, San Mateo, CA (US); Cyrus Behroozi, Palo Alto, CA (US)

(73) Assignee: Tropos Networks, Inc., San Mateo, CA (US)

( * ) Notice: Subject to any disclaimer, the term of this patent is extended or adjusted under 35 U.S.C. 154(b) by 833 days.

(21) Appl. No.: 09/818,423

(22) Filed: Mar. 26, 2001

(51) Int. Cl.  
*H04B 7/212* (2006.01)

(52) U.S. Cl. ...................... 370/348; 370/443
(58) Field of Classification Search ................ 370/346, 370/348, 431, 443, 449  
See application file for complete search history.

(56) References Cited

U.S. PATENT DOCUMENTS

| | | | |
|---|---|---|---|
| 5,471,469 A | | 11/1995 | Flammer, III et al. |
| 5,636,220 A | | 6/1997 | Vook et al. |
| 5,684,800 A | | 11/1997 | Dobbins et al. |
| 5,818,820 A | * | 10/1998 | Anderson et al. ........... 370/280 |
| 5,901,362 A | | 5/1999 | Cheung et al. |
| 5,943,322 A | * | 8/1999 | Mayor et al. ................ 370/280 |
| 6,044,062 A | | 3/2000 | Brownrigg et al. |
| 6,097,703 A | | 8/2000 | Larsen et al. |
| 6,104,712 A | | 8/2000 | Robert et al. |
| 6,134,231 A | | 10/2000 | Wright |
| 6,173,191 B1 | | 1/2001 | Jennings, III |
| 6,342,844 B1 | | 1/2002 | Rozin |
| 6,418,299 B1 | | 7/2002 | Ramanathan |
| 6,449,484 B1 | * | 9/2002 | Grubeck et al. ............. 455/450 |
| 6,611,509 B1 | * | 8/2003 | Hayashi et al. ............. 370/335 |
| 6,647,002 B1 | * | 11/2003 | Suda et al. .................. 370/335 |
| 6,687,239 B1 | * | 2/2004 | Koprivica .................... 370/341 |
| 6,694,141 B1 | * | 2/2004 | Pulkkinen et al. .......... 455/454 |
| 6,798,765 B1 | * | 9/2004 | Larsson ....................... 370/351 |
| 6,907,257 B1 | * | 6/2005 | Mizutani et al. ............ 455/464 |
| 2001/0030969 A1 | * | 10/2001 | Donaghey et al. .......... 370/397 |
| 2002/0016926 A1 | * | 2/2002 | Nguyen et al. .............. 713/201 |

OTHER PUBLICATIONS

"A Review of Current Routing Protocols For Ad Hoc Mobile Wireless Networks," E. Royer and C.K. Toh found on www.ee.surrey.ac.uk/personal/g.aggelou/papers/adhoc review.pdf, also in IEEE communications, Apr. 1999.
Hierarchical Network Routing, found on www.cs.su.oz.au/~piers/papers/routing/routing.html, L.P. Laudy, R.J. Kumme, A. Fekete.

(Continued)

*Primary Examiner*—Chi Pham  
*Assistant Examiner*—Blanche Wong  
(74) *Attorney, Agent, or Firm*—Blakely, Sokoloff, Taylor & Zafman LLP; Judith A. Szepesi

(57) ABSTRACT

It is the object of this invention to provide a method of increasing the data throughput of a multi-hop wireless link. A method is provided which mitigates self-interference, without precluding the use of omni-directional transceivers. Distributed protocols for channel allocations in a multi-hop wireless communication system are described. These protocols result in channel allocations that increase the capacity utilization of the network and render the system robust to localized interferers and jammers.

26 Claims, 17 Drawing Sheets

OTHER PUBLICATIONS

"Think more than wired," found on www.nwr.nokia.com.

"Ricichet," found on www.metricom.com.

"Mesh—you are the network," found on www.meshnetworks.com.

"Turbowave—the future is yours to imagine," found on www.turbowave.com.

"Nova Engineering," found on www.novaroam.com.

S. Corson, J. Macker, Mobile Ad hoc Networking (MANET), The Internet Society, Jan. 1999, found on www.ietf.org/rfc/rfc2501.txt, 12 pages.

IEEE Standard for Information Technology—No. 802.1d, 1998 Edition, "Part 3 Media Access Control (MAC) Bridges,": Found on http://standards.ieee.org/reading/ieee/std/lanman/802.1D-1998.pdf, and adopted by the ISO/IEC and redesignated as ISO/IEC 15802-3: 1998, 373 pages.

IEEE Draft 802.1w /D10, "Part 3 Media Access Control (MAC) Bridges, Amendment 2—Rapid Reconfiguration," abstract found on http://www.drizzle.com/~aboba/IEEE/802-1w-d10.pdf, adopted by the ISO/IEC and redesignated ISO/IEC 15802-3:1998, 163 pages.

K. Grace, "Mobile Mesh Routing Protocol," Sep. 22, 2000, Internet Draft from the IETF Manet Working Group found on http://www.mitre.org/tech_transfer/mobilemesh, 8 pages.

E.M. Royer and C-K. Toh, "A Review of Current Routing Protocols for Ad-Hoc Mobile Networks," IEEE Personal Communications, Apr. 1999, pp. 46-55.

L.M. Feeney, "A Taxonomy for Routing Protocols in Mobile Ad Hoc_Networks," Swedish Institute of Computer Science, SICS Technical Report T99/07, Oct. 1999, 20 pages.

"Providing Solutions For Mobile Adhoc Networking," Web product brochure downloaded from www.mobilemesh.com on Mar. 26, 2002, 8 pages.

* cited by examiner

| Channel | Switch Time | Linger Time |
|---|---|---|
| 11 | 5 seconds | 5 seconds |
| 7 | 10 seconds | 5 seconds |
| 5 | 15 seconds | 5 seconds |

Fig. 12

METHOD AND SYSTEM TO PROVIDE INCREASED DATA THROUGHPUT IN A WIRELESS MULTI-HOP NETWORK

FIELD OF THE INVENTION

This invention is concerned with the area of wireless systems, and more particularly with increasing the data throughput between the end points of a wireless multi-hop link.

BACKGROUND

The use of wireless devices to transfer data is becoming increasingly prevalent. Two wireless devices, a source and destination, may communicate directly with each other. For example, a cellular phone communicates with a cellular base station to provide voice connectivity to the public switched telephone network. Another example is a wireless local area network where wireless client devices communicate with an access point.

The data transfer can be one-way, from the source to the destination, or two-way, where data traffic also travels from the destination to the source. The maximum rate of throughput of data between the source and the destination, hereafter referred to simply as throughput, is an important quantity that characterizes the performance of the data channel between the source and destination. It is desirable to increase the throughput as much as possible.

In certain cases, it is desirable for the source and destination wireless devices to route or relay their data transmission through intermediate wireless devices. These intermediate devices are generally referred to as routers, repeaters, or relays. The intermediate devices may be needed when the source and destination are not within transmission range of each other. Other wireless devices can be used to relay the data forming a chain from the source to the destination, with each link in the chain being a wireless device is in transmission range of the originating device. The number of wireless devices in the chain may be as small as one, or as large as need be. FIG. 1 shows a source marked S 100 communicating to a destination marked D 170, via the intermediate wireless routers marked I1 110, I2 120, I3 130, I4 140, I5 150, and I6 160. The two-way arrows between the routers indicate a link that has been formed between those routers. For example, node I1 110 can communicate directly with node I2 120, and vice-versa. However, to reach I4 140, node I1 must communicate through nodes I2 120, and I3 130.

A half-duplex transceiver is a wireless device that can either transmit or receive, but not both at the same instant of time. An example of a half-duplex transceiver is that provided by a personal computer with an IEEE 802.11 interface. Wireless devices may also consist of a separate transmitter and receiver at each node. If transmitter and receiver can transmit and receive data from another node at the same time, the wireless device is called full-duplex transceiver. An example of a full-duplex transceiver is an IS-95 CDMA cell phone. FIG. 2 illustrates the difference between half-duplex and full-duplex transceivers. As can be seen, full duplex transceivers can transmit and receive at the same time, while half-duplex transceivers either receive or transmit. However, half-duplex transceivers are generally cheaper, and more easily available. Therefore, many devices use half-duplex transceivers. Often, two half-duplex transceivers are included in each device, such that one half-duplex transceiver can transmit, while the other one receives data.

One prior art method of implementing of a chain or a mesh of wireless devices is used in wireless ad-hoc networks, as described by MANET, DARPA SURAN, etc. Two wireless devices communicate with each other by leveraging peer wireless devices to route or relay the data. The applications envisioned in such networks included battlefield (military) communications and mobile (civilian) networks.

Another prior art method that forms a chain of wireless devices is the transceivers and full-duplex repeaters that constitute the infrastructure of Metricom's network. The repeaters sit atop street lamp poles and relay information from client user modems to wired access points and vice-versa.

Wireless devices must be equipped with antennas in order to receive and transmit data. Omni-directional antennas transmit or receive signals with equal strength in all directions in the horizontal plane. If the antennas are not omni-directional, they are known as directional antennas, and these have radiation patterns that are not circularly symmetric in the horizontal plane.

The directional properties of one hypothetical directional antenna that is connected to a source S 300 in the horizontal plane are illustrated in FIG. 3. As can be seen, the source S 300 can only communicate with destination D2 320, and not with any of D1 310, D3 330, D4 340, D5 350, and D6 360 since the antenna does not transmit or receive in those directions. One prior art method, used by Radiant, Plc., employs directional links on both transmitters and receivers among wireless devices forming a chain.

Directional links are overly restrictive for many forms of terrestrial communication since they permit communication only a certain fixed direction at any given instant of time. For applications such as the prior art mentioned above, MANET and DARPA SURAN, directional links (in contrast to omni-directional links), are not usable since they would prevent formation of an ad-hoc mesh network between wireless devices in arbitrary directions. In these applications, there may not be prior knowledge of the direction between a given wireless device and another wireless device. Therefore aiming antennas with directional links presents a difficulty, especially when setting up communication using a chain of wireless devices that may be reconfigured based on changes in network of wireless devices including the introduction or malfunction of one of the devices.

SUMMARY

It is the object of this invention to provide a method of increasing the data throughput of a multi-hop wireless link. A method of using a distributed protocol for channel allocation in a multi-hop wireless communication system is described. The protocols results in a channel allocation that increases the capacity utilization of the network and renders the system robust to localized interferers and jammers.

BRIEF DESCRIPTION OF THE DRAWINGS

The present invention is illustrated by way of example, and not by way of limitation, in the figures of the accompanying drawings in which like reference numerals refer to similar elements and in which:

FIG. 12 illustrates one embodiment of the format of a reservation packet.

DETAILED DESCRIPTION

A channel assignment scheme for a node in a wireless network is described. The method includes assigning a first channel to an uplink for a node, and assigning a second channel for a downlink for a node. The method further maintains the first channel and the second channel distinct from an uplink channel of a default gateway for the node. By maintaining multiple channels that do not interfere with each other, interference between nodes is minimized. The present application focuses on increasing the throughput of wireless links. Furthermore, it addresses the issues of new nodes joining the system, and foreign nodes causing interference within the system. By providing a distributed protocol executed at each node, the central server does not need to control the channel assignment of each node. Thus, the present system may be used for large network, and scales from a small network to a large network without any problems.

The throughput of a chain of wireless links is limited at least by the 1. throughput of each individual wireless link that makes up the chain;
2. speed of each intermediate wireless device to transmit the data it received on to the next wireless device in the chain (i.e. forward data); and
3. for wireless devices with omni-directional transmitters, interference of the data transfer taking place between a pair of wireless devices in the chain with data transfer taking place between another pair (we shall refer to this as self-interference of the chain of wireless links, or simply self-interference).

Self-interference poses a particularly important problem. This interference prevents the bandwidth of communication in a chain of links from reaching the rate of a single link.

Figure 5:
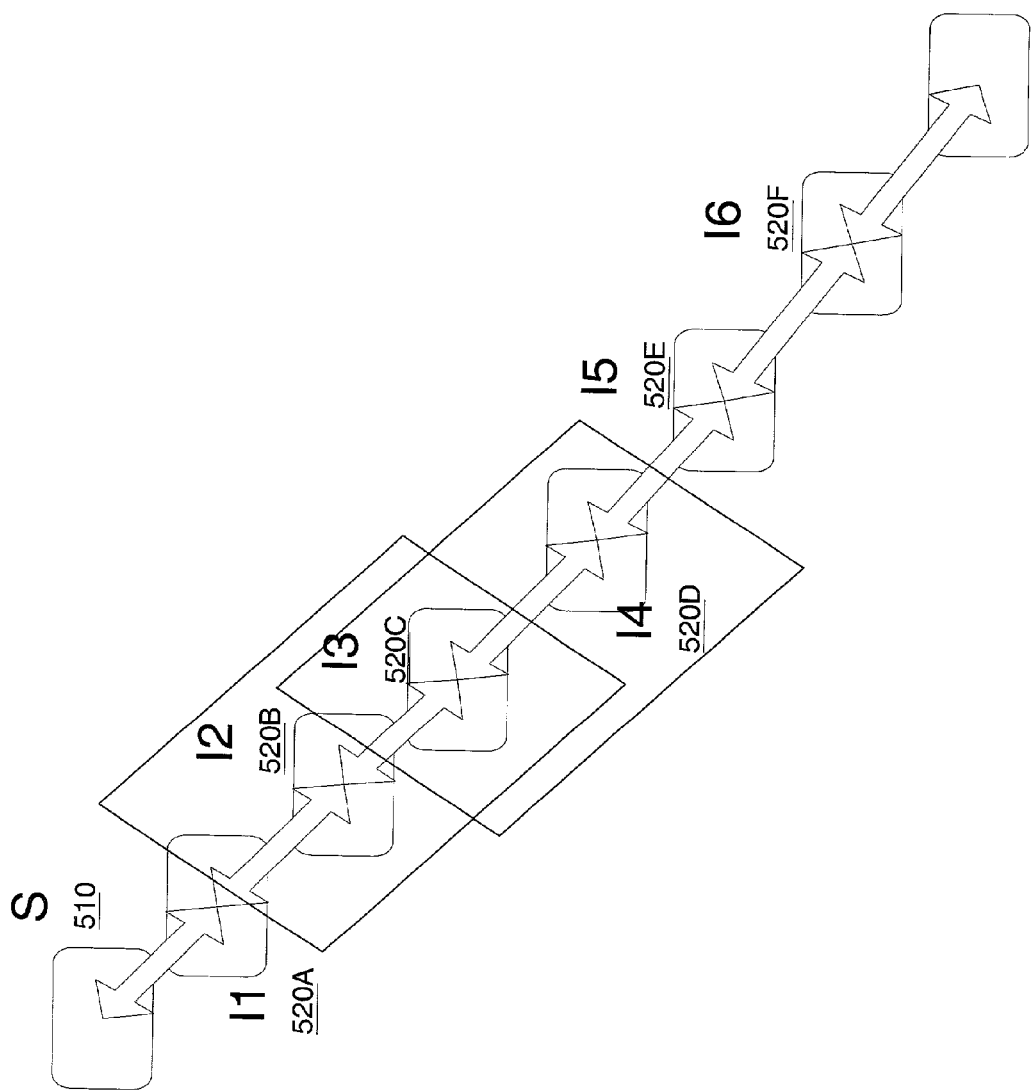
FIG. 5 illustrates one embodiment of a chain of wireless links formed by a set of half-duplex transceivers at a plurality of nodes.

FIG. 5 illustrates a chain of wireless links formed by a half-duplex transceiver at each of the nodes S 510, I1 . . . I6, D 530. Two boxes are drawn in FIG. 5 to indicate the range of transmission of nodes I2 520B and I3 520C, which have omni-directional transmitters. To summarize the connectivity, two nodes that are connected by an arrow are within transmission range of each other, while conversely two nodes that are not connected by an arrow are not within transmission range. In the process of S 510 communicating with D 530, each intermediate node will have to relay the data from S 510 to D 530, and similarly for communication from D 530 to S 510. If I2 520B is transmitting, then I1 520A and I3's 520C transceivers will be within receiving range. Similarly, if I3 520C transmits, then its transmission could be received by I2 520B and I4 520D.

One form of self-interference arises when I1 520A is transmitting to I2 520B, and I2 520B is transmitting to I3 520C. The transmission from I2 520B interferes with the reception at I2 520B of the transmission from I1 520A. The MAC/PHY layer protocol standards such as IEEE 802.11b mitigate this form of self-interference by implementing carrier-sensing, such that node I2 520B can transmit only when the channel is clear, i.e., neither of its neighbors I1 520A and I3 520C is transmitting. This effectively reduces the effective throughput experienced by any node in the chain to one-half of the link capacity. One way to solve this problem is by having two transceivers at each node, each operating on a different channel or spreading code. By using two transceivers, each node can simultaneously transmit and receive data. By using different channels or spreading codes for the two transceivers, self-interference between the transceivers is reduced, or eliminated.

Another form of self-interference arises when I1 520A is transmitting to I2 520B, and I3 520C is transmitting to I4 520D. The transmission of I3 520C also propagates to I2 520B, and interferes with the transmission from I1 520A to I2 520B.

Similarly, if I3 520C attempts to transmit to I2 520B at the same time that I1 520A attempts to transmit to I2 520B, the two transmissions will interfere and thereby be disrupted. This form of self-interference is addressed in MAC/PHY layer protocol standards such as the IEEE 802.11b by implementing an RTS/CTS mechanism: when I1 520A has data to send to I2 520B, it issues an RTS (Request To Send) control packet to I2 520B that reserves the channel for a certain duration of time. If I2 520B is free to receive data, it responds to I1 520A with a CTS (Clear To Send) control packet that gives I1 520A clearance to send data to I2 520B during the requested interval of time. Any node, other than I1 520A and I2 520B, that overhears the RTS or the CTS or both must remain silent for the duration of the transfer from I1 520A and I2 520B. In the example of FIG. 5, node S 510 (which overhears the RTS) and node I3 520C (which overhears the CTS) must remain silent while I1 520A is transmitting to I2 520B. In other words, in a chain of nodes as in FIG. 5, only one out of every three nodes can be transmitting at a given time. This effectively limits the throughput to one third of the capacity of a single link. This is referred to as the "One-Third Problem". It can be seen that this reduction in throughput is characteristic of mesh networks where data is forwarded across multiple wireless links.

Figure 1:
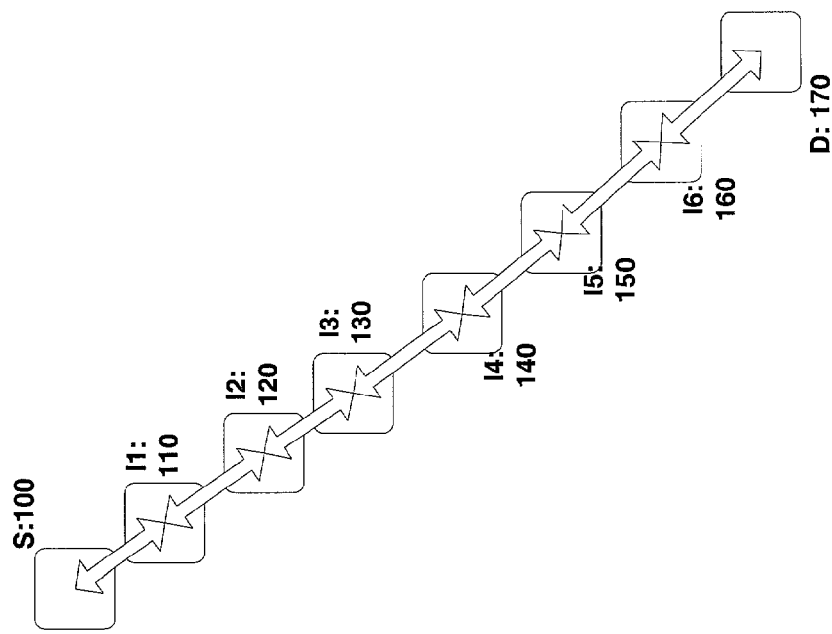
FIG. 1 is a system diagram of a prior art communication system using an ad-hoc wireless network.
Figure 2:
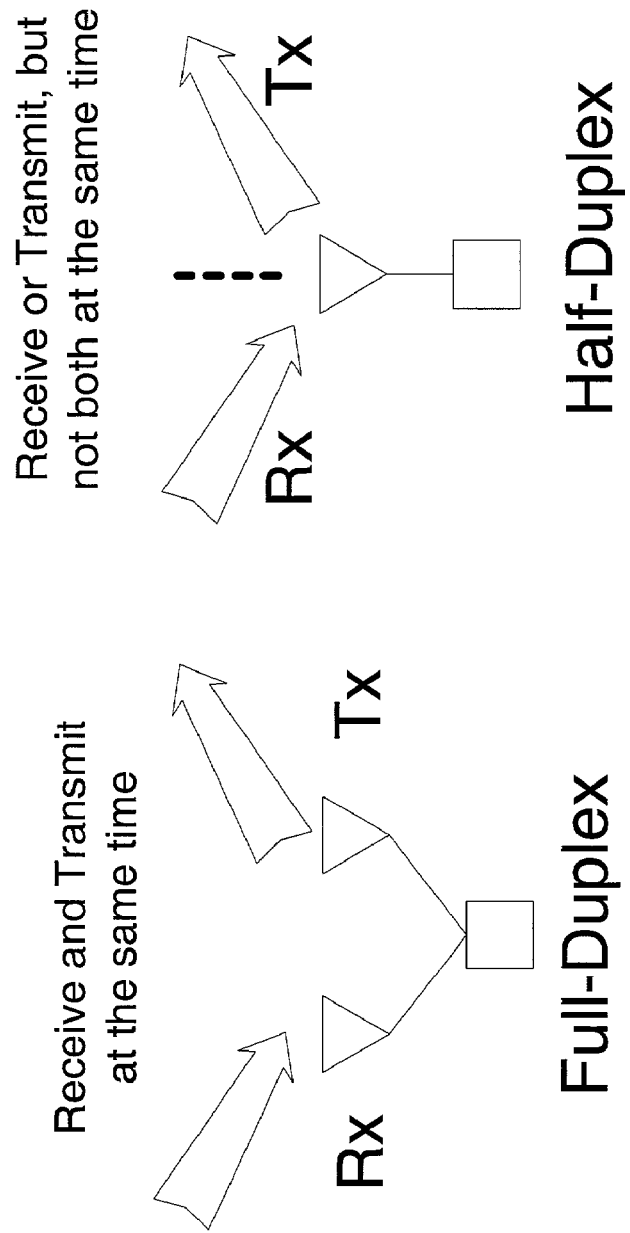
FIG. 2 is a diagram illustrating the difference between half-duplex and full-duplex transceivers.
Figure 3:
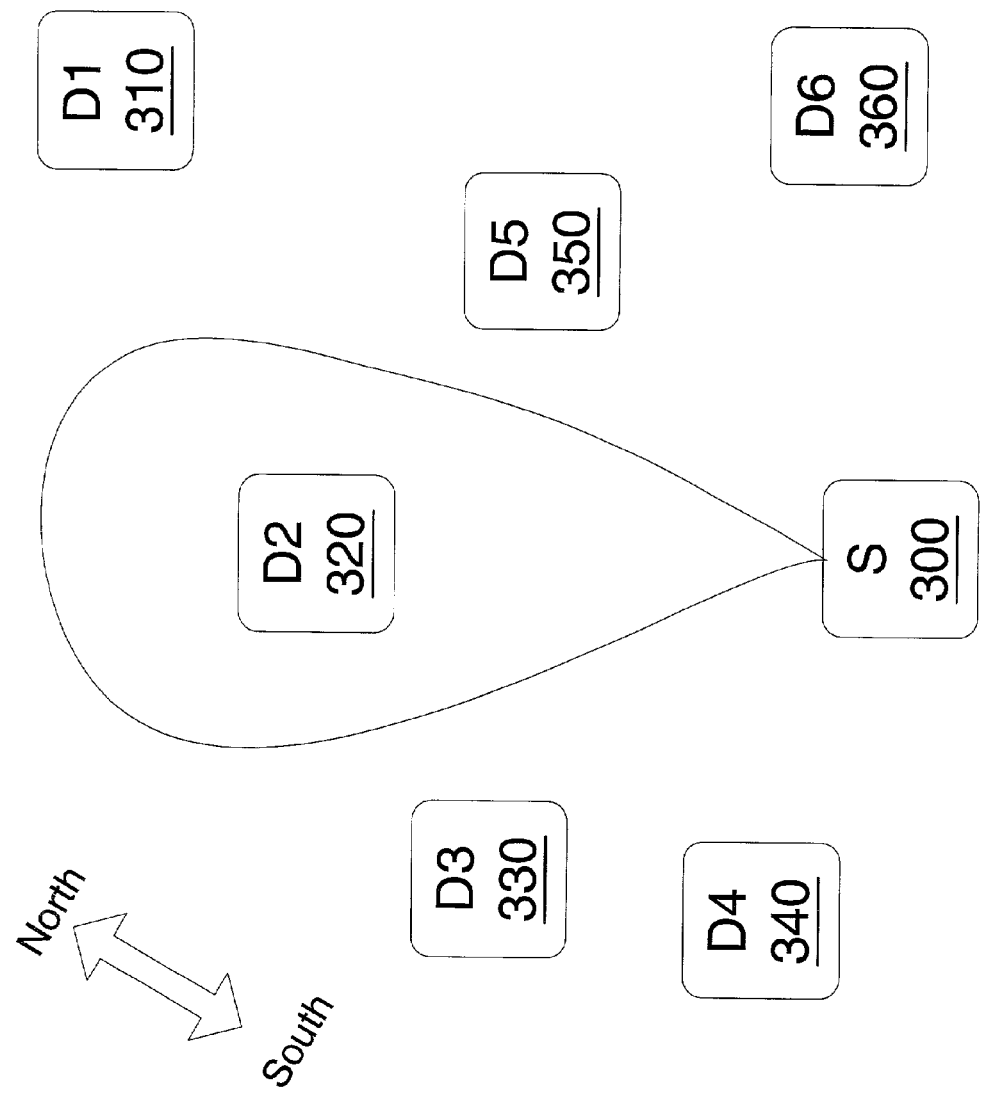
FIG. 3 is a system diagram of a prior art communication system using directional antennas.
Figure 4:
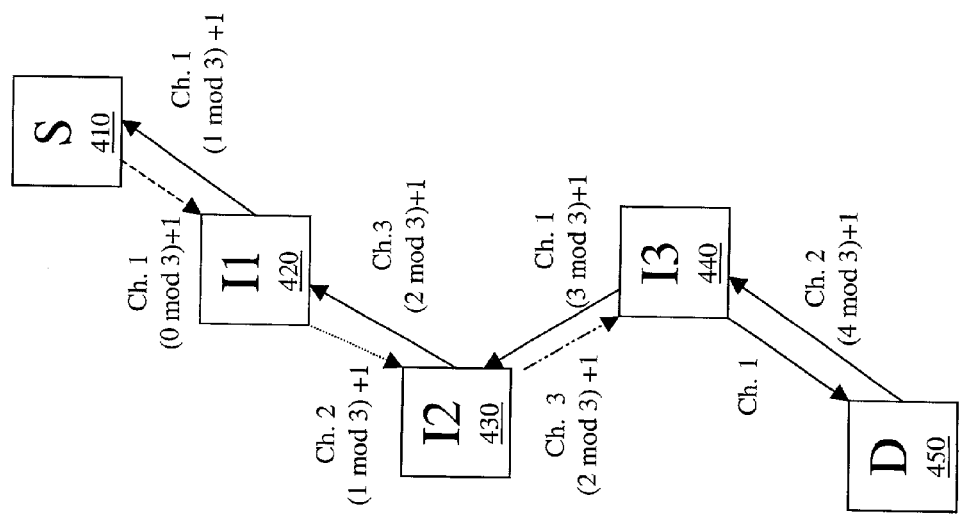
FIG. 4 illustrates one embodiment of a wireless mesh network.

As an example of this situation in practice, consider the unlicensed 2.4 GHz ISM band which is divided into three non-overlapping channels of 22 MHz each. A half-duplex radio chipset such as the Prism II (www.intersil.com) is capable of raw data rates upto 11 Mbps, although the actual throughput experienced in a specific environment may be much lower. Let us say, however, for the sake of illustration, that the link does operate at 11 Mbps. If a mesh network of these radios (S, I1, I2, I3, I4, I5, I6, D) were deployed as shown in FIG. 4, the actual throughput experienced between any two nodes separated by more than two hops in the mesh would be no better than ⅓*(11 Mbps)=3.67 Mbps, because of the One-Third Problem.

To minimize the effect of this form of self-interference, each link can be enabled to operate independently without interference from the transmissions occurring on other adjacent links. Each relay node can be equipped with two (half-duplex) wireless transceivers, one for the "uplink" and one for the "downlink". Each half-duplex transceiver is capable of receiving and transmitting, though not at the same time.

The transmissions from one of the half-duplex transceivers in this setting may cause interference to the reception by the other half-duplex transceiver of another transmission from a more distant radio. This is known in the Art as the "Near-Far Problem". For one embodiment, this problem is solved by having the two half-duplex transceivers operate on distinct channels or with different spreading codes in a spread-spectrum system. Due to imperfections in the transceiver design there may be some leakage of the signal (broad side-lobes) outside of the intended frequency band. For one embodiment, filter circuits are used to eliminate or suppress the unwanted side-lobes. For one embodiment, physical separation of the radiating elements (antennas) associated to the distinct half-duplex transceivers is further implemented to mitigate the Near-Far Problem.

The present invention incorporates techniques for minimizing interference between adjacent links and solving the "One-Third Problem", thereby allowing the throughput on a multi-hop link to reach the capacity of a single link and effecting a threefold increase in capacity utilization.

In one embodiment, the transceivers on adjacent links operate on different "channels". For one embodiment, the channels are frequency channels. The term "channel" is to be understood in a generalized sense as designating a method of formatting data in such a way as to render it effectively distinguishable from other data transmissions. For instance, a cell-phone transmission may be effectively distinguished from a TV broadcast because they occur on different frequency "channels." On the other hand, a data transmission on a horizontally polarized light-wave can be distinguished from one on a vertically polarized light-wave. Thus, "channels" may be distinguished by polarizations. In the ISM band example, a channel could be one of the eleven frequency bands available for direct-sequence spread-spectrum transmissions. Alternatively, each channel could be a different spreading code in a spread-spectrum CDMA system; or each channel could correspond to a different polarization for the transmitted waveform modulated with the information bits. In one embodiment, this channel assignment scheme is implemented on nodes that have only one wireless interface (transceiver) that is sequentially switched between the uplink and downlink channels (depending on the destination of the transmission)—this solves the One-Third Problem, but the throughput is only one-half of the link capacity because of the half-duplex nature of the radios. In another embodiment, this channel assignment scheme is implemented on nodes that have two wireless interfaces (transceivers), one operating on the "uplink" channel and one operating on the "downlink" channel. In this embodiment, the throughput attains the full link capacity.

Figure 6:
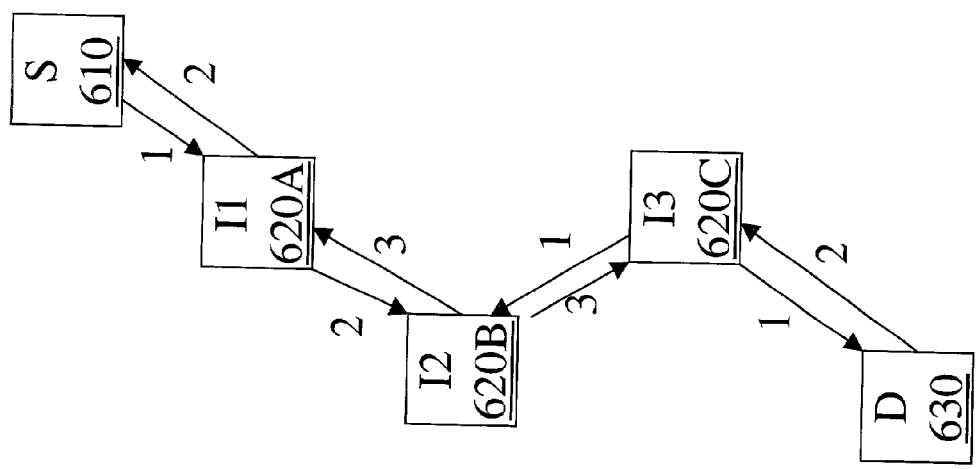
FIG. 6 is a system diagram of one embodiment of the channels assigned to individual links in a multi-hop mesh network topology.

This solution is illustrated in FIG. 6 where each of the relays I1 620A, I2 620B, and I3 620C possess dual half-duplex transceivers with S 610 communicating with I1 620A on "channel" 2, I1 620A communicating with I2 620B on "channel" 3, and I2 620B communicating with I3 620C on "channel" 1, and the channel allocation repeating for every link thereafter down the chain.

Figure 7:
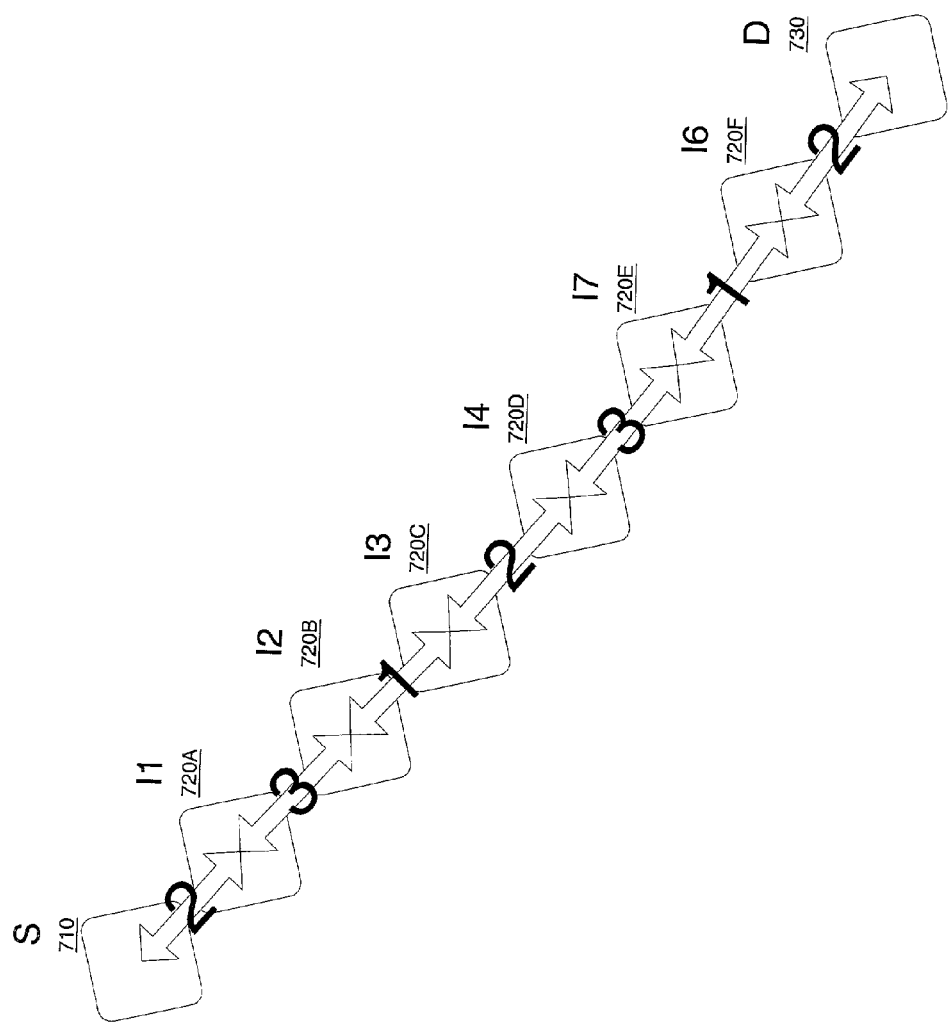
FIG. 7 is a system diagram of one embodiment of the channels assigned to the links in the multi-hop chain of FIG. 2.

As a further example, the channel allocation for an ad hoc wireless mesh network is illustrated in FIG. 7. Each link is shown to operate on "channel" 1, 2, or 3. If transmissions on one of the three "channels" do not interfere with those on any of the others (no "cross-channel interference"), this type of channel allocation eliminates interference. This scheme can be implemented as long as there are at least 3 "channels", and as long as each node is capable of transmitting and receiving on multiple of these channels.

If there is cross-channel interference, the scheme proposed above may reduce the self-interference, but not eliminate it. Transmissions on different channels may interfere with each other if, for instance,
  1. the channels overlap in frequency space, or
  2. if the leakage of the data signal from one frequency channel into a nearby channel is large enough to cause non-negligible interference.

In one embodiment, the interference caused by each channel to the others is reduced by spacing them sufficiently far apart in frequency space. Even if the channels are separated in frequency space, there may still be inter-channel crosstalk as a result of imperfections in transceiver design that cause leakage of the RF signal outside of the intended band. In one embodiment, this may be mitigated by the use of filter circuits. For one embodiment, for each channel on which the devices may operate, there is a corresponding filter circuit. When a particular channel is selected, the appropriate filter circuit is switched into the system. For another embodiment, there is a single filter associated with each transceiver. The filter may be tuned for use with the selected frequency, to filter signals so as to transmit and/or receive only the appropriate signals.

In one embodiment, the transceivers are spread-spectrum modulated, and adjacent links operate on orthogonal spreading codes, as typically seen in code division multiplexing. This allows reception without interference even on the same channel. In one embodiment, the inter-channel interference can be minimized by physically isolating adjacent links by employing directional, sectorized, or smart antennas at the ends of each link. The channel assignment described in FIG. 6 solves the "One-Third Problem" as described above.

Figure 8:
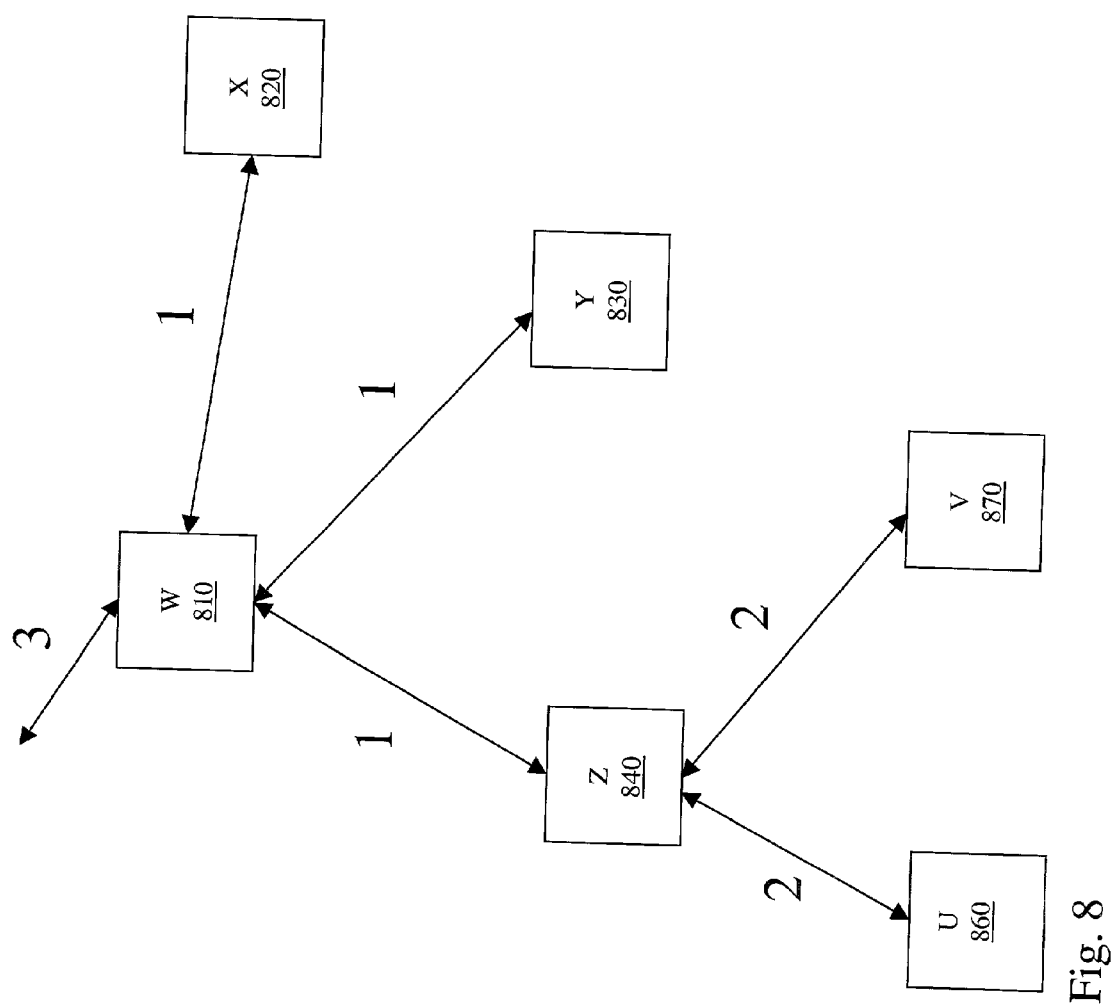
FIG. 8 is a system diagram of one embodiment of the channels assigned to individual links in a multi-hop mesh network topology of FIG. 6.

The present invention also incorporates a protocol for assigning channels to individual links in a multi-hop mesh network topology as illustrated in FIG. 8. There exist routing protocols that allow each node in the wireless network to learn the number of hops to a distinguished node in the network (the "Server"). An example of such a routing protocol is disclosed application Ser. No. 09/751,262, filed Dec. 29, 2000, entitled "Method And System To Provide A Routing Protocol For Wireless Devices."

The information regarding the number of hops from any client to the server is used in the present application to determine channel allocations. When the network is initialized, the routing protocol runs on a common channel and sets up routes between nodes. In one embodiment, the common channel on which the routing protocol operates is a distinct frequency band. In another embodiment, the common channel is a unique spreading code. In one embodiment, the common channel is a unique spatial signature or radiation pattern. In one embodiment, the common channel is a unique polarization for the transmitted wireless data. In another embodiment, the routing protocol operates over all available bands, codes, and/or spatial patterns. Alternative ways of distinguishing the common channel from standard communications channels may be used.

Since the system is assumed to have a minimum of three available, non-interfering channels, for simplicity these channels will be referred to as channels 1, 2, and 3, henceforth.

Figure 9:
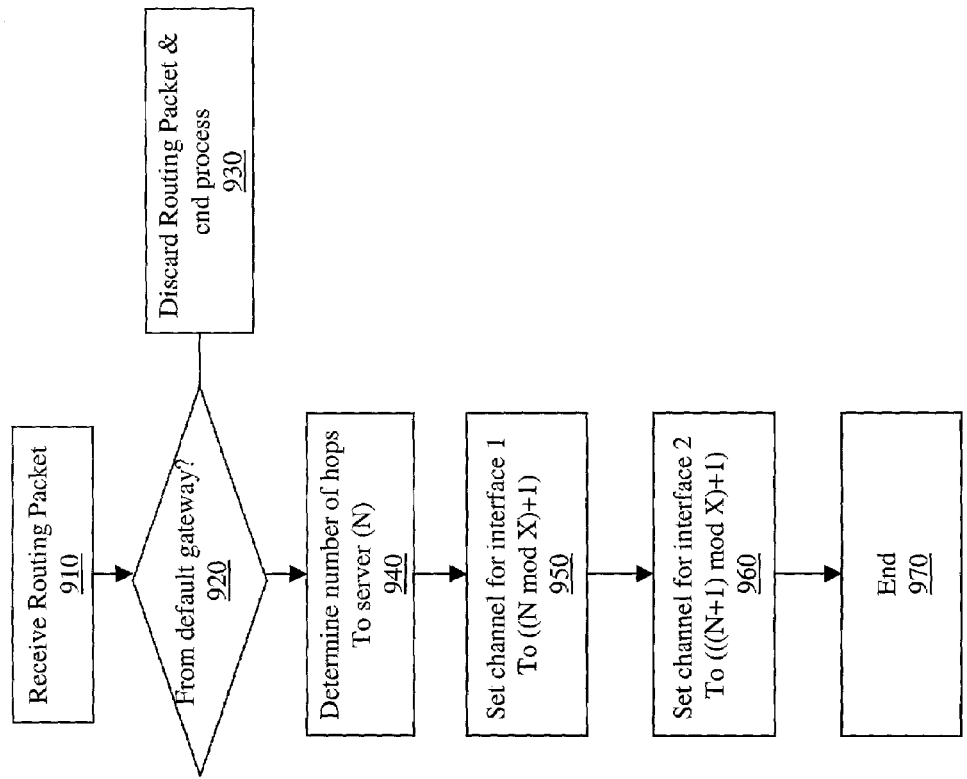
FIG. 9 is a flowchart of one embodiment of a protocol for assigning channels to individual links in a multi-hop mesh network topology.

If, through the operation of the routing protocol, a node determines that it is N hops from the Server, it sets wireless interface A to channel N (mod 3)+1 and wireless interface B to (N+1) (mod 3)+1. This ensures that alternating links employ distinct channels, in accordance with the assignment scheme discussed earlier. FIG. 9 is an exemplary flowchart of a node setting up its channels in accordance with the above-described scheme. At block 910, a routing packet is received from an upstream node. At block 920, the node determines whether the routing packet is from its default gateway. One embodiment of the process of selecting the default gateway is described in copending application Ser. No. 09/751,262. If the routing packet is not from the node's upstream node, the process continues to block 930, and the routing packet is discarded and the process ends. If, at block 920, the node determined that the routing packet was from the node's default gateway, the process continues to block 940.

At block 940, the number of hops to the server, through the default gateway is determined. For one embodiment, this data is carried within the routing packet. For another embodiment, a further packet may carry this information. The number of hops is designated as N.

At block 950, the channel for a first interface is set to (N (mod X)+1), where N is the number of hops to the server, and X is the number of available channels, which is at least three. By using a minimum of three channels, interference upstream and downstream is avoided. This is discussed in more detail below. However, if more than three channels are available, the system may utilize any number of channels.

At block 960, the channel for the second interface is set to ((N+1) (mod X)+1). This makes certain that the two interfaces have different channels. The process then ends at block 970.

Using the process of FIG. 9, in a three channel system, node I1 820A of FIG. 8, which is one hop from the Server S 810, will set its uplink interface to channel (1 modulo 3)+1=2 and its downlink interface to channel (1+1 modulo 3)+1=3. Similarly, node I2 of FIG. 8, which is two hops from the Server S 810, will set its uplink interface to channel (2 modulo 3)+1=3 and its downlink interface to channel (2+1 modulo 3)+1=1. These assignments are in accordance with the channel assignments outlined earlier. Thus, the present system provides a distributed and coordinated allocation of channels to all nodes in a wireless network through automated individual decisions by the nodes themselves, as opposed to an imposition by a central authority, or by manual intervention. Furthermore, the nodes make their decisions based on information carried in routing packets. This permits seamless expansion of the network, without added overhead for channel allocation.

In addition to the problem of self-interference discussed above, there is the further problem of interference caused by other devices operating in the frequency band or by intentional or unintentional jammers. Such interference generally also reduces the throughput experienced by nodes in the network, and may in extreme cases render the network unusable. The regulations imposed by the FCC on operation in the unlicensed bands are designed to promote coexistence of multiple operators and networks in the same area. These restrictions include limits on the total radiated power by any transmitter and on the antenna gain. In addition, the modulation schemes mandated in the unlicensed bands (spread-spectrum or OFDM) offer some degree of interference rejection capability. In practice however, these regulations mitigate, but do not solve, the coexistence problem of multiple networks in the same area. A foreign node (one that does not belong to the network) that is transmitting at a given time could (depending on its proximity and radiated power, etc.) interfere with data transmissions within the network. The foreign node effectively raises the noise floor, thereby reducing the signal-to-noise ratio at a receiver in the network. Another possible interferer is a noise source that is localized within the frequency band. Coexistence of multiple networks in the same geographical area is an important practical problem that is likely to grow in importance with the widespread network deployments currently being undertaken by multiple operators in the unlicensed bands.

The unlicensed bands have multiple channels (either frequency bands or spreading sequences or frequency hopping patterns) available for use. Through judicious channel selection, a network operator may be able to achieve efficient data transmission even in the presence of interference sources. More generally, in any multi-hop wireless communication system with multiple available channels, effective channelization schemes could result in significant gains in terms of better spectral efficiency (frequency reuse) and improved interference rejection. For one embodiment, a distributed and dynamic channel allocation protocol is used to solve the self-interference problem (One Third Problem) even in the presence of localized interferers or jammers.

The base assumption is that there is some set of channels such that transmissions on any one of these channels does not interfere (or interferes minimally) with simultaneous transmissions on any other channel(s) when these transmissions are taking place in the same geographical area. In general, there is a smooth gradation that extends from channels that interfere strongly with each other to channels that have negligible impact on each other. The number of these non-interfering channels may be large, so that there may be many ways to choose the channel allocations on each link such that there is little or no interference among transmissions. The term channel herein refers to one or more channels chosen from a maximal set of non-interfering channels. For one embodiment, a minimum of three non-interfering channels is used to ensure that the self-interference (One Third Problem) discussed above is removed.

For one embodiment, each node may have more than two wireless interfaces. In the 2.4 GHz ISM band, for instance, there are 3 non-overlapping, and hence non-interfering, channels. If this band were used, a device could have three wireless interfaces, i.e., 3 half-duplex wireless transceivers, each one using a different one of the three available non-interfering channels. By using a low power transmission on the third channel, interference with the upstream transmissions of the default gateway may be avoided. Alternatively, in systems with more than 3 channels, more than 3 transceivers may be used.

A set of channel allocations is referred to as "efficient" if it satisfies the two conditions that no node is allocated the same channel for the uplink and the downlink (condition E1), and that no node is allocated a downlink channel that its default gateway is allocated for its uplink (condition E2).

For example, an inefficient allocation may be one in which a node Z has the same channel (channel 1) for its uplink as for its downlink. This allocation violates the first condition (E1) for efficiency. This inefficiency results in node Z not being able to transmit and receive at the same time, since the transmission and reception interfere with each other. Another example of an inefficient allocation is one in which the downlink channel for node Z is the same as the uplink channel for its default gateway, node X, not meeting the second condition (E2) for efficiency. This inefficiency results in node Z causing interference with node X when it transmits downstream, while node X is transmitting upstream. Since generally transmissions are not fully directional, when node Z is transmitting downlink its transmission also reaches node X uplink, resulting in interference.

Any channel allocation that is efficient, according to this definition, solves the ⅓ problem. As an example, the channel allocation scheme outlined earlier in this patent application results in an efficient allocation. There are, in general, other efficient allocations for the system, all of which solve the ⅓ problem and are therefore equivalent in the absence of interferers. However, in the presence of interferers, one or more of these efficient allocations might be superior to the others. The goal of the following is to demonstrate a protocol that results in the efficient channel allocation that provides maximum interference-rejection in the presence of interferers.

The channel allocation scheme proposed above has some degrees of freedom in its implementation. The scheme, for one embodiment, utilizes three channels, regardless of the number that may be actually available. Furthermore, for a given set of three channels chosen for use, there are actually 6 ways of allocating the channels, within the system proposed earlier—the 6 allocations differ by permutations of the three chosen channels. While these 6 allocations are equivalent in performance in the absence of sources of interference, one of the 6 allocations might actually be more optimal than the others in the presence of interferers that might be physically localized and transmitting on specific channels. Therefore, it would be desirable to allocate channels in such a way as to additionally provide maximum interference rejection, resulting in best coexistence.

The present distributed protocol results in an efficient channel allocation—one that solves the ⅓ problem—that also provides the excellent interference-rejection. There are two elements to the problem of efficient channel allocation in a multi-hop wireless network in the presence of interferers: (1) the identification of the "best" channels on the uplink and the downlink from each node, and (2) the assignment of these channels to the uplink and the downlink.

Figure 10:
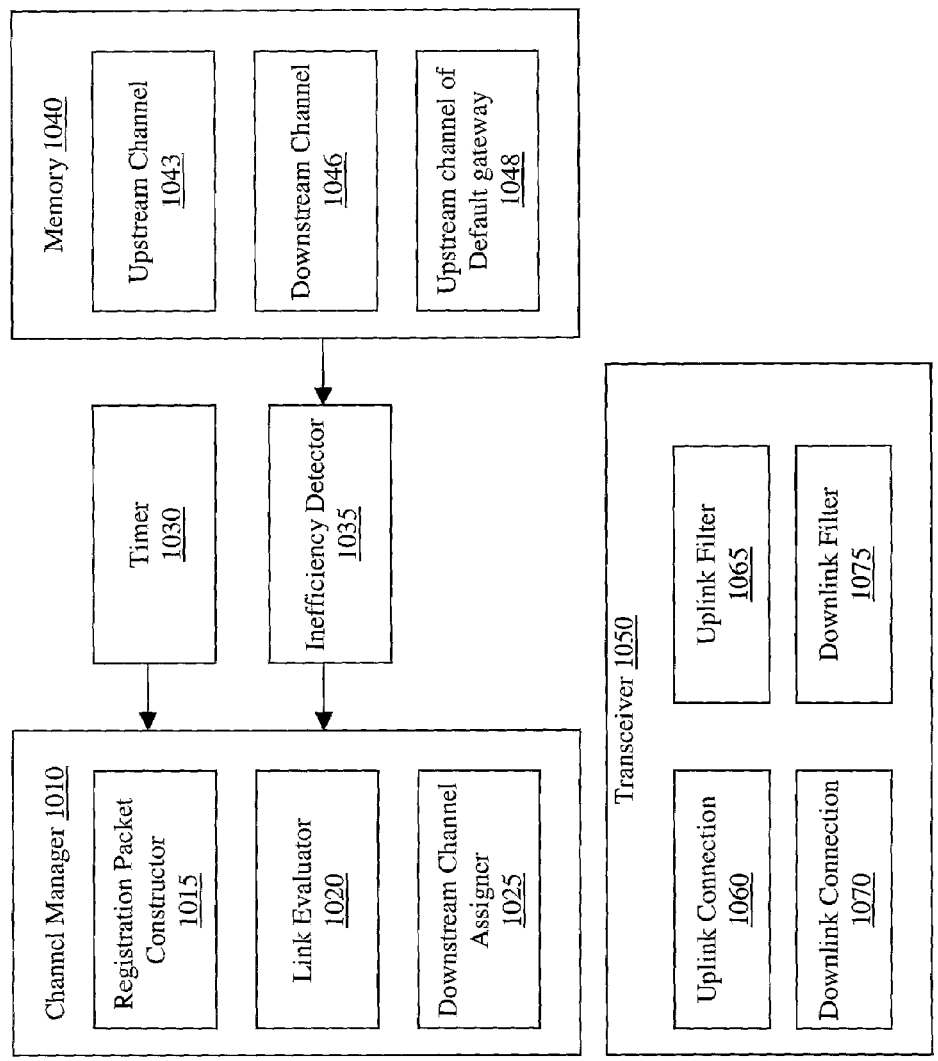
FIG. 10 illustrates one embodiment of a node.

FIG. 10 illustrates one embodiment of a node. For one embodiment, each node in the network has a software agent ("the Channel Manager") 1010 that communicates periodically, and on each available channel, with the corresponding software agents on neighboring downstream nodes and determines which channel corresponds to the best link quality. Having determined the best downlink channel, the Channel Manager 1010 instructs the Channel Managers on the neighboring downstream nodes to switch to that channel.

The channel manager 1010 includes a registration packet constructor 1015, which constructs a registration packet to be sent downstream. The channel manager 1010 further includes a link evaluator 1020 and assignor 1025 which evaluate each channel tested, and assign the best channel(s) to the downstream links. Channel manager 1010 may be periodically triggered by timer 1030. For one embodiment, channel manager 1010 may further be triggered by inefficiency detector 1035. Inefficiency detector 1035 monitors for the efficiency conditions R1 and R2, using data from memory 1040. The conditions E1 and E2 apply to the global allocation (across all nodes and links), while the conditions R1 and R2 are applied locally, at a node originating the Downstream Channel Discovery Protocol.

Thus, inefficiency detector 1035 triggers channel manager to initiate the downlink channel discovery protocol if any two of the upstream channel of the node, the downstream channel of the node, or the upstream channel of the node's default gateway, are identical.

Further shown is transceiver 1050, with two channels indicated, each channel having its own filter. For one embodiment, a single filter 1065, 1075 may be allocated to each transceiver, and the filter may be tuned, to filter for the appropriate channel conditions selected. For another embodiment, each filter 1065, 1075 may actually be composed of multiple individual filters. The filters 1065, 1075 may switch in the appropriate filtering circuitry for each channel being used.

The node may further include a directional antenna 1080, 1085 associated with each transceiver. Although the two directional antennas 1080, 1085 are illustrated as being next to each other, for one embodiment, the antennas are separated by a maximum distance, to limit interference.

Periodically, or in response to specific events, the Channel Manager 1010 on a given node initiates a Downlink Channel Discovery protocol.

Figure 11:
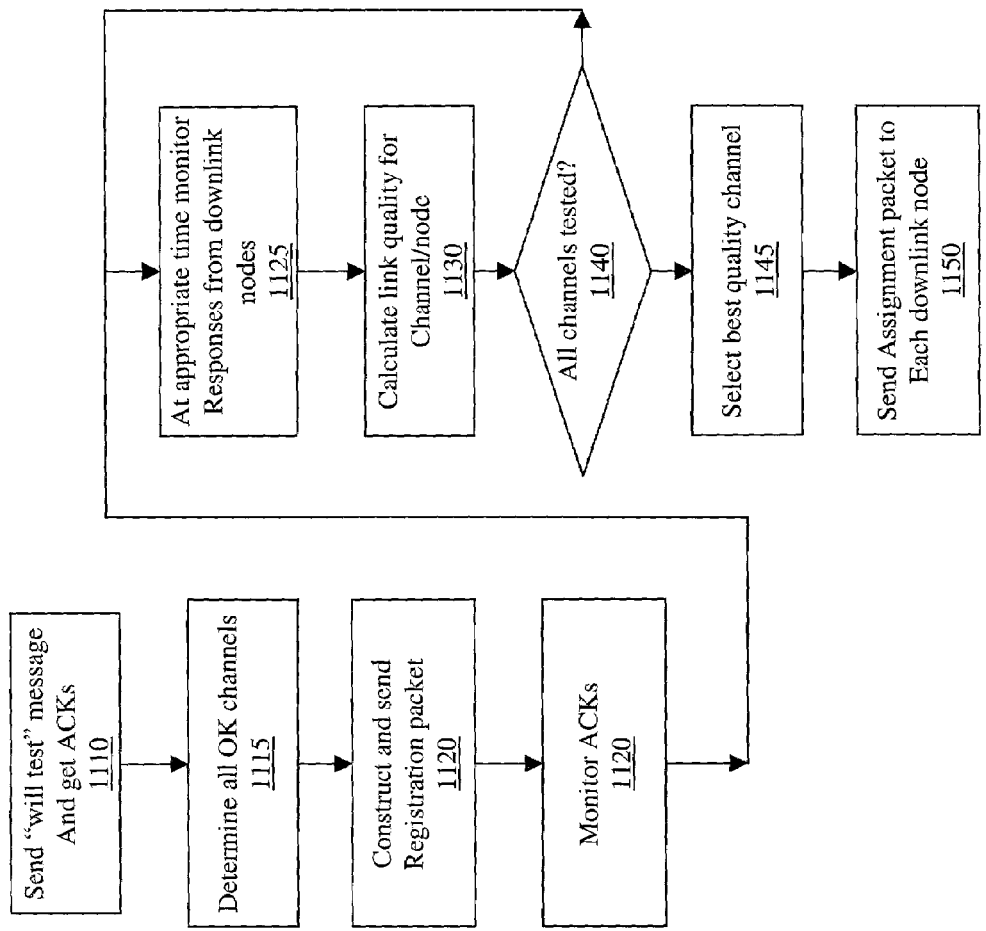
FIG. 11 is a flowchart of one embodiment of a protocol for channel assignment using the downlink channel discovery protocol.

FIG. 11 is a flowchart of one embodiment of channel assignment using the downlink channel discovery protocol. The process starts at block 1110, when the Channel Manager on the given node sends a broadcast message on the common channel (the channel used to send routing and other control information) indicating that it is planning to test its downstream links. All nodes one hop downstream from the given node (i.e., all nodes for which the given node is the default gateway) respond to this message with acknowledgement packets that indicate their readiness to participate in the link-testing. All nodes that are not one hop downstream from the given node ignore the broadcast.

At block 1115, the given, or originating, node, determines all channels that may be used for its downstream link. Each channel listed is a channel drawn from the maximal set of non-interfering channels that are not being used on the uplink from the originating node (condition R1), and not being used on the uplink from the originating node's default gateway (condition R2).

At block 1120, the reservation packet is constructed and sent. The Reservation Packet may also include information about which channel is being used for the uplink from the given node. The Reservation Packet indicates the sequence of channels on which the link is going to be tested, and the times at which the tests will be performed. It is not necessary that the clocks on all the nodes be synchronized. The timing information in the broadcast, for one embodiment, is a relative offset from the current time, which may be different on the various nodes if the clocks are not synchronized.

An illustration of the Reservation Packet that may be used for this action is shown in FIG. 12. The reservation packet of FIG. 12 may be used in the network shown in FIG. 15. Node Z might send a Reservation indicating to its downstream neighbors that in 5 seconds it will switch to channel 11, stay on that channel for 5 seconds, then switch to channel 7, stay on that channel for 5 seconds and finally switch to channel 5 and stay on it for 5 seconds. The reservation packet further indicates that the channel being used on the uplink from Z is channel 1. Note that these times are merely exemplary, and alternative timing may be used.

At block 1125, the originating node monitors the acknowledgments sent in response to the reservation packet. For one embodiment, the Reservation Packet is acknowledged by all nodes one hop downstream that receive this packet, and ignored by all other nodes that receive it.

At block 1130, the originating node monitors packets sent by its downstream nodes on the selected channel. At each time (or time-offset) specified in the Reservation Packet, the given node and all nodes one hop downstream that have agreed to participate in the link-testing switch the interface dedicated to this link to the channel reserved for this time slot in the Reservation Packet. Having switched to the specified channel, each downstream node waits a random small interval of time and then sends a predetermined and fixed number of packets to the Channel Manager of the originating node.

At block 1135, the originating node evaluates the link quality shown by the packets. In one embodiment, the link quality is estimated by the packet-error rate on the link. The originating node's Channel Manager counts the total number of (uncorrupted) packets received, and compares it to the total number transmitted. The total number transmitted may be determined by adding the corrupted and uncorrupted packets, and further may account for nodes from whom no packet was received at all, based on the node responses to the original acknowledgement to the broadcast. The Channel Manager uses this data to determine the quality of the downlink on that particular channel. In one embodiment, the link quality may be based on a throughput figure of merit. The originating node's Channel Manager measures the throughput observed for the data transmissions from the downstream neighbors and uses this data to determine the quality of the downlink on that particular channel. In one embodiment, the link quality estimator is the signal-to-noise ratio observed on the link operating on that particular channel. This list of link quality estimators is intended to be illustrative, rather than exhaustive—other estimators will be apparent to those skilled in the art. In one embodiment, the Channel Manager separately evaluates the performance on that particular channel of each of the links that comprises its downlink by counting the number of uncorrupted packets received corresponding to that link and comparing it to the number of packets transmitted by the downstream node corresponding to this link.

At block 1140, the process determines whether all of the channels specified in the reservation packet have been evaluated. If not, the process returns to block 1130, to monitor the next channel.

In one embodiment, after the process has cycled through all the channels specified in the Reservation Packet, at block 1145 the originating node determines the "best" channel for the downlink, based on the link-quality statistics for each channel. In one embodiment, the determination of the best channel for the downlink may be based additionally on the link-quality statistics observed on the channel in the past. In one embodiment, the given node determines individually the "best" channel for each of the links comprising the downlink.

Having determined the best channel or channels for the downlink, at block 1150, the Channel Manager of the originating node broadcasts an Assignment Packet announcing its choice. Each of the nodes that is one hop downstream acknowledges this packet and switches its uplink to the channel specified in the Assignment Packet and stays on this channel thereafter, until the next round of link-testing. For one embodiment, each downstream node is assigned the same channel. For another embodiment, different downstream nodes may receive different channel assignments, if more than three channels are being used. Thus, for one embodiment, instead of broadcasting, Channel Manager may send a directed message to each node, assigning its channel.

At block 1155, the process ends, having completed the Downlink Channel Discovery protocol.

For one embodiment, a node will initiate the Downlink Channel Discovery Protocol when it first joins the network. It will also initiate the protocol if at any time one or more of the channels allocated to its downlink does not satisfy both conditions described above, i.e. that its downlink channel is different from its uplink channel, and that its downlink channel is different from the uplink channel of its default gateway. It will also initiate the protocol periodically. For one embodiment, the period for discovering downlink channels may be as long as a day, i.e. downlink channel discovery is initiated once per day. For another embodiment, the period for discovering downlink channels may be as short as an hour.

Through operation of the Downlink Channel Discovery Protocol at each node in the network, an allocation of channels for the whole network is achieved. It can readily be seen that through the application of conditions (R1) and (R2) at each node, the allocation achieved for the network as a whole is guaranteed to be efficient (i.e., satisfies conditions (E1) and (E2)).

Figure 13:
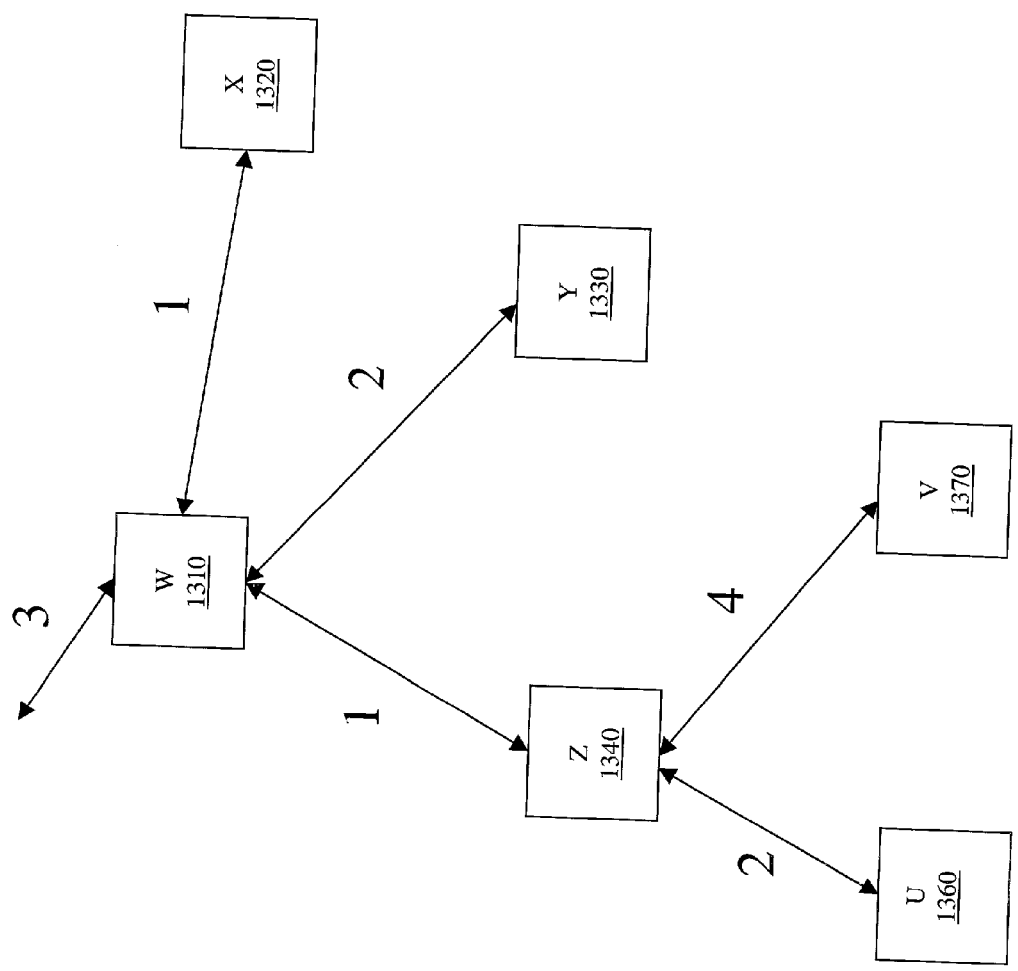
FIG. 13 is a system diagram of one embodiment of channel allocation.
Figure 14:
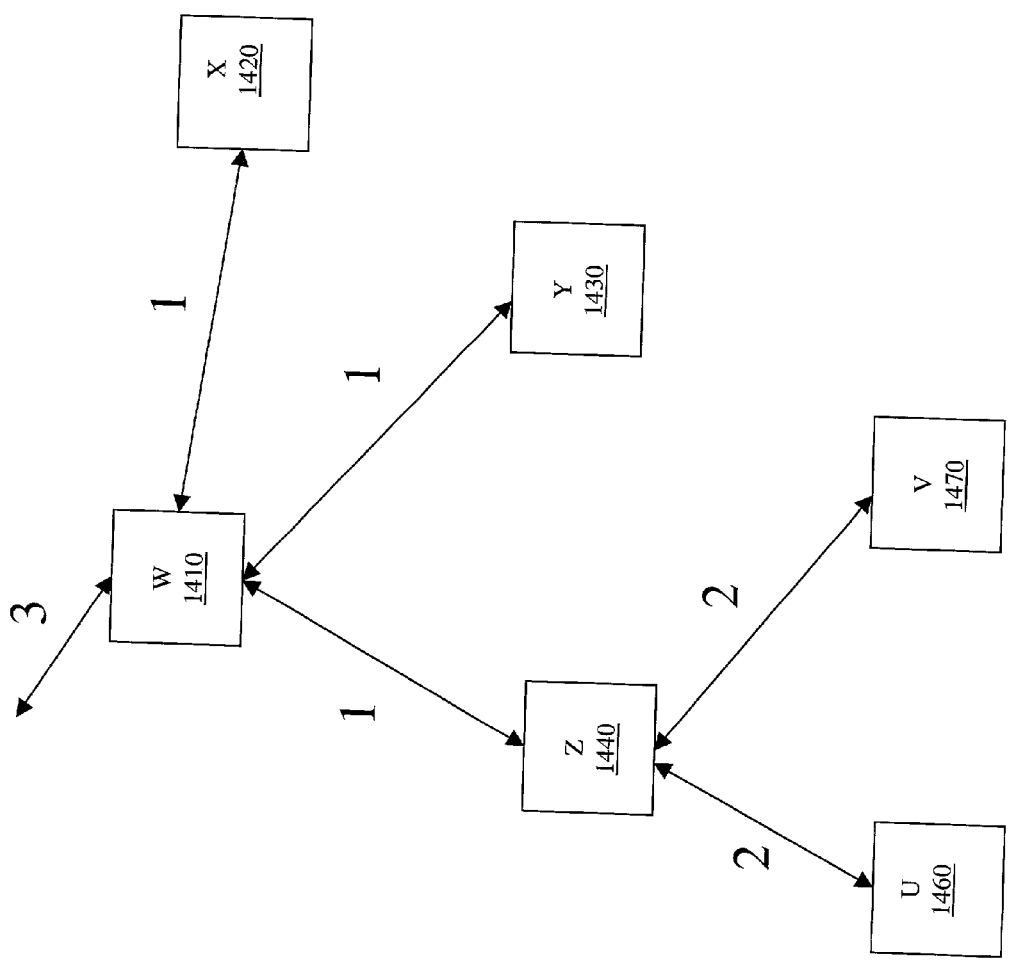
FIG. 14 is a system diagram of another embodiment of channel allocation.

FIGS. 13 and 14 show two examples of channel allocations that might result from the operation of this protocol. In one embodiment, there are multiple channels that are selected for the downlink from a given node with each of the links that comprise this downlink being allocated a specific channel. FIG. 13 illustrates an example of a channel allocation that could result. The originating node in FIG. 13 is designated Z 1310. Node Z 1310 may be anywhere in the structure, but as can be seen, node Z 1310 has some downstream nodes. It will be noted that node Z 1310 in FIG. 13 communicates on channels 1, 2 and 6. Node Z 1310 might be a wireless device with 3 (or more) wireless interfaces. FIG. 13 illustrates the instance in which node Z 1310 selects multiple downlink channels. This permits node Z 1310 to set up the preferred channel for communicating with each of its downstream nodes.

FIG. 14 illustrates an alternative embodiment in which a single channel is selected for the downlink from a given node and all links that comprise this downlink share this channel. In both FIGS. 13 and 14, the allocation satisfies conditions (E1) and (E2). This scheme, therefore, provides a distributed mechanism for achieving an efficient channel allocation (as measured by minimum packet loss rates) in a multi-hop wireless network in the presence of interferers.

This scheme has the merits of being fully distributed (all decisions are made based on locally available information) and having a low computational complexity (the computation involved is a simple comparison of packet-error-rates on the different available channels) or similar quality evaluations. The scheme is sensitive to narrowband interferers as well as to interferers occupying one or more of the system's channels.

Figure 15:
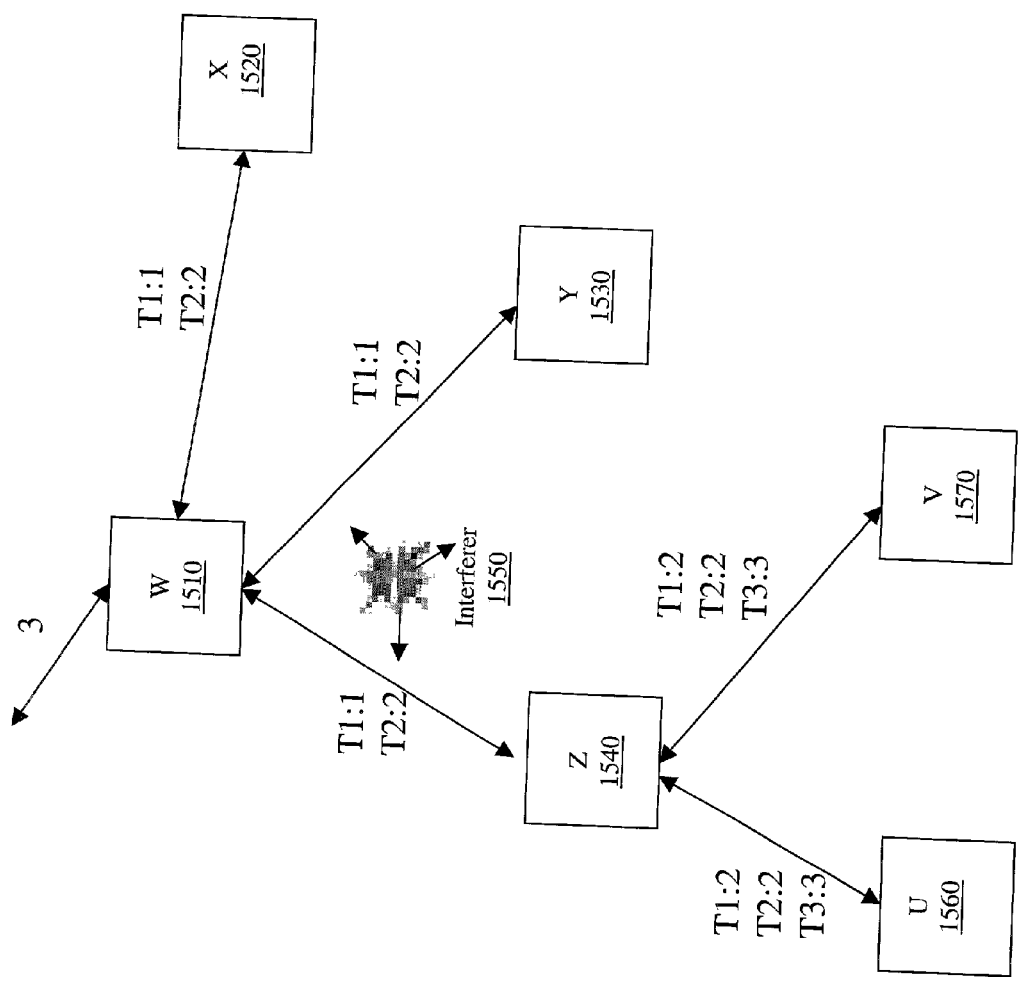
FIG. 15 is a system diagram illustrating a response to an interferer.

As an example, suppose the channel allocations in the system are as shown in FIG. 15, and this set of allocations is an efficient allocation that implements the best interference rejection per the above-described protocol. Now suppose that an interferer 1550 operating on channel 1 appears near node W 1510, as shown in FIG. 15. The best allocation of channels prior to the appearance of the interferer, at time T1, was to use channel 1 for the downlink from node W 1510 to nodes X 1520, Y 1530, and Z 1540. The "best" allocation in the presence of the interferer is different, since channel 1 is now not usable due to the proximity of the interferer 1550. The link-testing protocol starts in accordance with the period set for it, and tests the links WX 1525, WY 1535 and WZ 1545. The link-testing protocol will find that the degradation of link quality as a result of the interferer makes channel 1 suboptimal, and makes another channel (here numbered channel 2) better.

Thus, at time T2, each of the links WX 1525, WY 1535, WZ 1545 is switched to channel 2, by sending an Assignment packet to each of nodes X 1520, Y 1530, and Z 1540. While channel 2 is an allocation that satisfies conditions (R1) and (R2) at node X 1520, it does not satisfy condition (R1) at node Z 1540, since the downlink channel of node Z 1540 is also channel 2. Node Z must then initiate the Downlink Channel Discovery Protocol to reset its downlink channels to nodes U 1560 and V 1570, since its uplink node has been changed to channel 2. This leads to a reallocation of the links ZU 1565 and ZV 1575 to channel 3 from channel 2, at time T3, a short time after T2.

Figure 16:
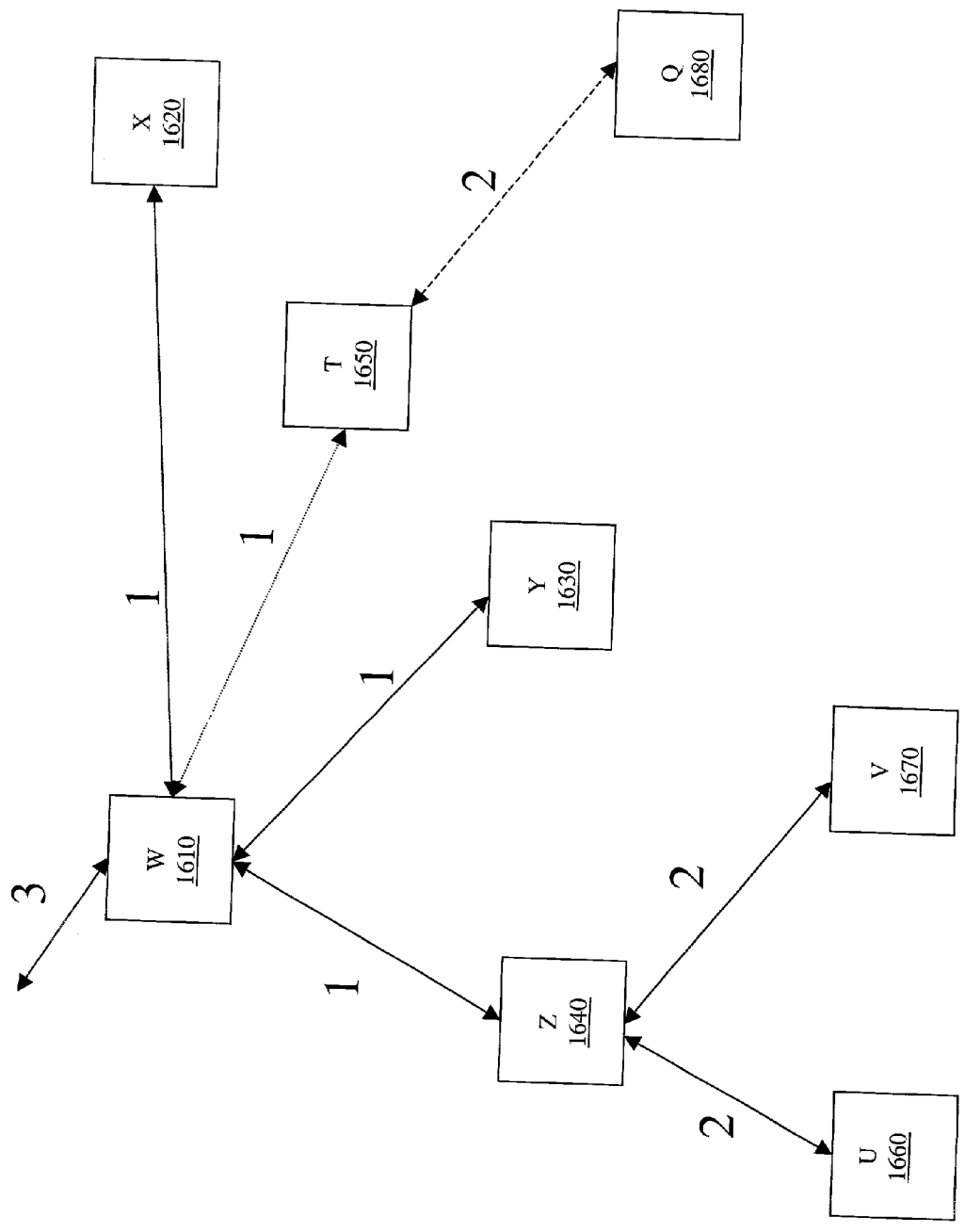
FIG. 16 is a system diagram illustrating a response to a new node being added into the system.

As another example, shown in FIG. 16, suppose that a new node T 1650 joins the network at the position shown in FIG. 16 1650. Note that new node T 1650 is within range of nodes W 1610 and X 1620. When it links into the system, node T 1650 receives messages on the common routing channel and learns that its default gateway should be set to W 1610. In one embodiment, it also learns from the routing messages that the data communications with X 1620 should be conducted on channel 1. Node T 1650 then sets its uplink channel to 1. To configure its downlink channel (if it has neighbors that are one hop downstream from it, such as node Q 1680 shown) it will initiate the Downlink Channel Discovery protocol, as was described above.

Figure 17:
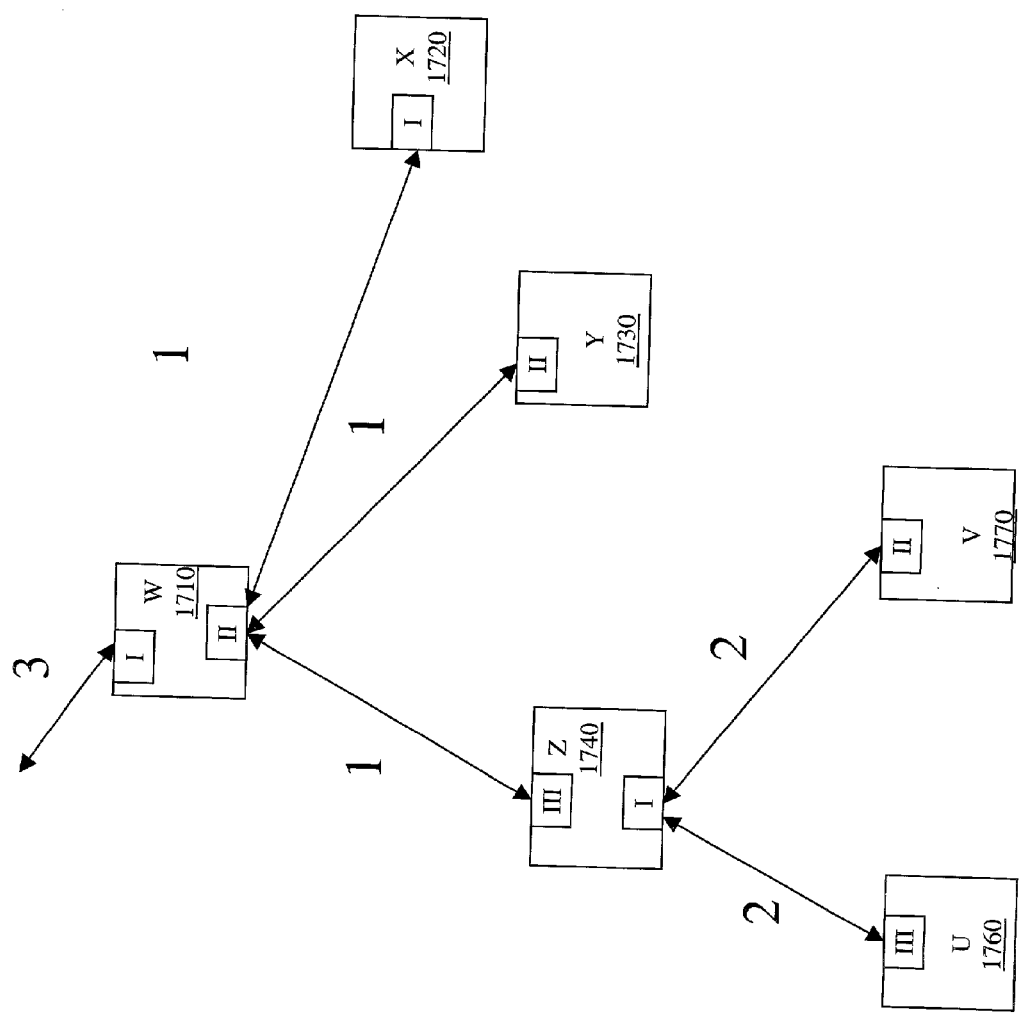
FIG. 17 is a system diagram of another embodiment of channel allocation.

For one embodiment, an alternative scheme of Downlink Channel Discovery may be used. If there are N non-interfering channels available in the system a device may have up to N interfaces, with each interface fixed to operate on a different channel. The operation of the embodiment of the Downlink Channel Discovery protocol illustrated in FIG. 17 results in the allocation of a "best" channel for each link. The difference in the operation of this embodiment of the protocol from what has been described earlier is that during the link-testing phase, each node switches interfaces rather than channels, based on the contents of the Reservation Packet. For example, the link Z–U in FIG. 17 is assigned to channel 2. Suppose channel 2 corresponds to interface I on device Z 1740 and interface III on device U 1760. Node Z 1740 sets its downlink connection to node U 1760 to use interface I, and node U 1760 will set its route to Z 1740 to use interface III. In this realization, the protocol, in addition to being a channelization scheme, is also an interface-selection (or routing) scheme.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A channel assignment scheme for a node of a mesh network, comprising:

the node determining a number of hops between the node and a server of the mesh network;
assigning a first channel to an uplink for the node;
assigning a second channel for a downlink for the node;
maintaining the first channel and the second channel distinct from an uplink channel of an upstream node;
wherein the assignment of first channel and the second channel for the node is based on the number of hops between the node and the server.

2. The method of claim 1, wherein there are multiple downlink nodes and the multiple downlink nodes use multiple downlink channels.

3. The method of claim 1, wherein the number of hops is determined from routing information carried in routing packets.

4. The method of claim 3, wherein the routing information is propagated in the network on some or all of the channels available in the system.

5. The method of claim 3, wherein the routing information is propagated in the network on a dedicated channel.

6. The method of claim 1, wherein the uplink channel of the node is assigned by a default gateway.

7. The method of claim 6, wherein assigning the downlink channel for a node comprises:
determining a plurality of potential channels for communication;
sending a reservation packet to trigger testing of each of the plurality of potential channels; and
assigning the downlink channel based on responses to the reservation packet.

8. The method of claim 7, wherein testing comprises:
each downstream node sending a plurality of packets to the node; and
evaluating a channel with a link quality greater than other channels.

9. The method of claim 8 wherein link quality is estimated by the throughput on the link.

10. The method of claim 8 wherein link quality is estimated by measuring the packet error rate on the link.

11. The method of claim 8 wherein link quality is estimated by the signal-to-noise ratio observed on the link.

12. The method of claim 8 wherein link quality is estimated by the latency observed on the link.

13. The method of claim 1, wherein the channels are frequency channels.

14. The method of claim 1, wherein the channels are different spreading codes in a spread-spectrum CDMA system.

15. The method of claim 1, wherein the channels are different polarizations of the transmitted waveform.

16. The method of claim 1, wherein the channels are different spatial signatures as determined by a smart antenna or adaptive antenna array at the receiver.

17. A channel assignment scheme for a node of a mesh network, comprising:
determining a number of hops between the node and a server of the mesh network;
assigning a first channel to an uplink for the node;
assigning a second channel to a downlink for the node;
maintaining the first channel and the second channel distinct from an uplink channel of an upstream node; and
assigning the first channel and the second channel for the node based on a number of hops from the node to the server and a number of available channels.

18. The method of claim 17, wherein data regarding number of hops to the distinguished node is carried within a routing packet to the node.

19. The method of claim 16, wherein assigning the downlink channel for a node comprises:
   determining a plurality of available channels for communication;
   sending a reservation packet to trigger testing of each of the plurality of available channels; and
   determining a channel based on responses to the reservation packet.

20. The method of claim 19, wherein testing comprises:
   each downstream node sending a plurality of packets to the node; and
   evaluating a channel based on link quality.

21. A node comprising:
   a transceiver having two interfaces, wherein each interface has a channel;
   and a channel manager, the channel manager to assign a first channel for a first interface to an uplink for a node and a second channel for a second interface to a downlink for the node, wherein the assignment of first channel and the second channel for the node is based on a number of hops from the node to a server.

22. The node of claim 21, wherein each interface is half-duplex.

23. The node of claim 21, wherein the channels are frequency channels.

24. The node of claim 21, wherein the channels are different spreading codes in a spread-spectrum CDMA system.

25. The node of claim 21, wherein the channels are different polarizations of the transmitted waveform.

26. The node of claim 21, wherein the channels are different spatial signatures as determined by a smart antenna or adaptive antenna array at the receiver.

* * * * *